United States Patent [19]

Hunt, III et al.

[11] Patent Number: 4,982,792

[45] Date of Patent: Jan. 8, 1991

[54] METHOD TO REDUCE MOVEMENT OF A CPF DEVICE VIA A SHEAR-THICKENING FLUID

[75] Inventors: William C. Hunt, III, Farmers Branch; Craig H. Phelps, Carrollton, both of Tex.

[73] Assignee: Mobil Oil Corporation, Fairfax, Va.

[21] Appl. No.: 459,118

[22] Filed: Dec. 29, 1989

[51] Int. Cl.⁵ .............................................. E21B 43/263

[52] U.S. Cl. ...................................... 166/299; 166/308

[58] Field of Search ................. 166/299, 300, 308, 63, 166/177; 299/13

[56] References Cited

U.S. PATENT DOCUMENTS 3,378,073 4/1968 Savins ................................ 166/308
3,400,796 9/1958 Savins et al. .
3,707,188 12/1972 Heckman ........................ 166/299 X
4,039,030 8/1977 Godfrey et al. .................... 166/299
4,714,114 12/1987 Jones .............................. 166/299 X
4,751,966 6/1988 Jones .............................. 166/308 X

*Primary Examiner*—George A. Suchfield
*Attorney, Agent, or Firm*—Alexander J. McKillop; Charles J. Speciale; Charles A. Malone

[57] ABSTRACT

A method for minimizing damage to downhole equipment utilized during controlled pulse fracturing ("CPF") where a shear thickening fluid is used as a tamp. A shear thickening aqueous fluid having particles therein overlies a CPF device thereby creating a tamp. Movement of the fluid by pressure forces resultant from the ignited propellant causes the fluid to thicken. This thickened fluid prevents and device and wireline from moving upwardly which minimizes damage thereto.

5 Claims, 1 Drawing Sheet

20
18
22
12
10
28
16

20
18
22
12
10
28
16

18
20
22
12
26
10
24
24

METHOD TO REDUCE MOVEMENT OF A CPF DEVICE VIA A SHEAR-THICKENING FLUID

FIELD OF THE INVENTION

This invention is directed to a method for minimizing damage to downhole equipment which is utilized during controlled pulse or high energy fracturing ("CPF"). More specifically, it is directed to the use of a shear thickening tamp which thickens and minimizes movement of said equipment.

BACKGROUND OF THE INVENTION

Stimulation of wells through mechanical fracturing can be accomplished by a method known as controlled pulse fracturing or high energy gas fracturing. A good description of this method appears in an article by Cuderman, J. F., entitled "High Energy Gas Fracturing Development," Sandia National Laboratories, SAND 83-2137, October 1983. Using this method enables the multiple fracturing of a formation or reservoir in a radial manner which increases the possibility of contacting a natural fracture. In the practice of this method, a housing means for containing a propellant is suspended into a wellbore. This housing means is placed downhole next to the oil or hydrocarbonaceous fluid productive interval.

The propellant in the housing means or molded body can belong to the modified nitrocellulose or the modified and unmodified nitroamine propellant class. Suitable solid propellants capable of being utilized include a double-based propellant known as M-5. It contains nitroglycerine and nitrocellulose. Another suitable propellant is a composite propellant which contains ammonium perchlorate in a rubberized binder. The composite propellant is known as HXP-100 and is purchasable from the Holex Corporation of Hollister, Calif. M-5 and HXP-100 propellants are disclosed in U.S. Pat. No. 4,039,030 issued to Godfrey et al. which is hereby incorporated by reference.

After placing the propellant means for creating multiple fractures into a housing means and suspending it downhole near all the oil or hydrocarbonaceous fluid productive interval, it is ignited. Ignition of the propellant means for creating the multiple fractures causes the generation of heat and gas pressure. To contain the generated propellant energy within the wellbore and formation, an aggregate stem, generally composed of cement, is placed above the housing means containing the propellant thereby sealing the wellbore. The suspended housing means and ignition means passes through the aggregate stem.

After ignition of the propellant means it is difficult to remove the aggregate stem, which often has to be drilled out. When removing the aggregate stem, the suspension means, generally a cable, and the ignition means, along with remnants of the housing means which previously contained the propellant, frequently fall into the wellbore. This debris may interfere with production of hydrocarbonaceous fluids from the formation. Drilling out the aggregate often damages the wellbore and formation.

Therefore, what is needed is a method to reduce the pressure forces on downhole equipment used during a CPF operation so as to avoid damaging said equipment and formation.

SUMMARY OF THE INVENTION

This invention is directed to a method for limiting upward movement of a housing means containing a propellant which is suspended from a wireline along with an igniting means during a controlled pulse fracturing operation. In the practice of this invention, a housing means containing a propellant is suspended into a shear thickening fluid within a wellbore near a formation's productive interval. The height of the fluid is sufficient to contain energy released from said propellant. The fluid contains an additive in an amount sufficient to cause it to shear thicken when moved upwardly by the pressure of the expanding gases resultant from ignition of the propellant.

After suspending the housing means into the fluid, the propellant is ignited thereby causing the generation of energy and pressure sufficient to initiate more than two radial fractures which are extended. The sudden movement of the fluid following propellant ignition causes the fluid to thicken thereby restricting movement of the wireline upwardly, thereby minimizing tool movement and lessening tool damage. After ignition, and when conditions in the wellbore and formation have reached the desired level of stability, said fluid can be removed.

It is therefore an object of this invention to minimize equipment damage following a CPF treatment through use of a shear thickening fluid tamp which reduces movement of the CPF tool and wireline.

It is another object of this invention to use a shear thickening fluid to slow or stop upward movement of a propellant housing means so as to minimize downhole equipment damage.

It is yet another object of this invention to use a shear thickening fluid to cause a high resistance to upwardly flowing gases eminating from an ignited propellant.

It is a still further object of this invention to provide for a shear thickening fluid which will be easy to place and remove from a well production string.

DESCRIPTION OF THE PREFERRED EMBODIMENTS

Figure 1:
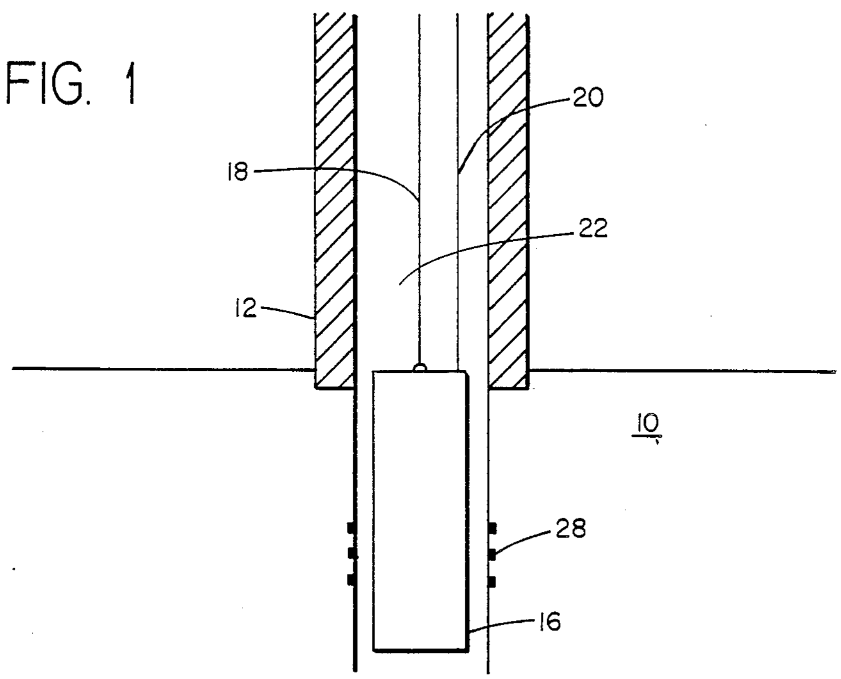
FIG. 1 is a graphic representation of a tamp fluid and housing means containing the propellant before ignition.

In the practice of this invention, referring to FIG. 1, a housing means 16 or molded tool body containing a propellant is placed into a wellbore 12 which penetrates a hydrocarbonaceous fluid producing formation 10 near the formation's productive interval. Wellbore 12 contains perforations 28 which communicate with the formation's productive interval. Housing means 16 is suspended into wellbore 12 in close proximity to the productive interval via a retrieval means, which generally will be a cable 18. A fluid 22 is directed into wellbore 12 thereby immersing housing means 16 for some vertical distance above housing means 16. Fluid 22 in wellbore 12 is of a height sufficient to balance the pressure in formation 10. Generally, this height will be at least about 500 feet above the housing means 16. Wellbore 12 is thereby filled with fluid 22 above the housing means. When filled in this manner, fluid 22 serves as a tamp for the propellant contained in housing means or canister 16. In order to ignite the propellant contained in the housing means or canister 16, a means for igniting the propellant is connected to housing means 16. The other end of the means for ignition is connected or affixed to a location at or above ground level above wellbore 12. Said means for ignition will generally be a conduit 20 containing an electrical wire which wire can be used to generate an electrical spark within canister 16 containing the propellant. Both retrieval means, 18 and ignition means 20 proceed to the surface and through the cap (not shown) on wellbore 12.

Upon ignition of the propellant, heat and gas are released within wellbore 12. The sudden movement of fluid 22 following the ignition of the propellant tends to drive cable 18 and the remnant of housing means or canister 16 upwards by gas expansion. However, the characteristics of the fluid are such that the movement caused by the rapidly expanding gas makes the fluid thicken. While not desiring to be bound by any particular theory, it is believed that shear thickening occurs because the frictional forces between suspended compound particles increase greatly as the velocity of the suspending medium increases, thus causing a high resistance to flow. Thus, the fluid becomes substantially more viscous and more resistant to flow up the production string or tubing when fluid velocities increase under the force generated by the ignited propellant. The shear thickening fluid slows or stops the upward movement of the wireline and housing means which minimizes damage to the wireline and housing means. Since substantially less movement is experienced by cable 18 and canister 16, damage to this equipment is lessened.

Fluids that can be utilized for shear thickening purposes include an aqueous mixture of compounds selected from a member of the group consisting of titanium oxide, cornstarch, polyvinyl alcohol-sodium borate mixtures, aqueous solutions of polymethacrylates and poly (alkyl methacrylates), gum arabic and borate ions, and guar gum and borate ions. Some of these shear thickening fluids are discussed in U.S. Pat. Nos. 3,378,073 and 3,400,796 which issued to Savins and Savins et al. respectively. These patents are hereby incorporated by reference herein in their entireties. The concentration of the thickening compounds utilized should be sufficient to impart the desired shear thickening qualitites and effect.

Concentrations of polyvinyl alcohol and borate ions which can be used herein are discussed in U.S. Pat. No. 3,378,073. Concentrations of polymethacrylates and poly (alkyl methacrylates) are discussed in U.S. Pat. No. 3,400,796. Other useful shear thickening materials, and concentrations therefor may be found in the literature which materials also include the category of dilant materials. U.S. Pat. No. 4,751,966 mentions the use of a prempable gel for use in increasing the vertical drag. This patent is hereby incorporated by reference herein. The concentration of compound utilized should be adjusted so as to obtain the maximum shear thickening effect for flow conditions anticipated in a specific CPF application.

As will be understood by those skilled in the art, the concentration of compound will depend upon the composition of the compound utilized. Any concentration of compound used should impart a shear thickening effect along the fluid/solid interfaces in a well flow system where CPF downhole equipment is utilized.

Figure 2:
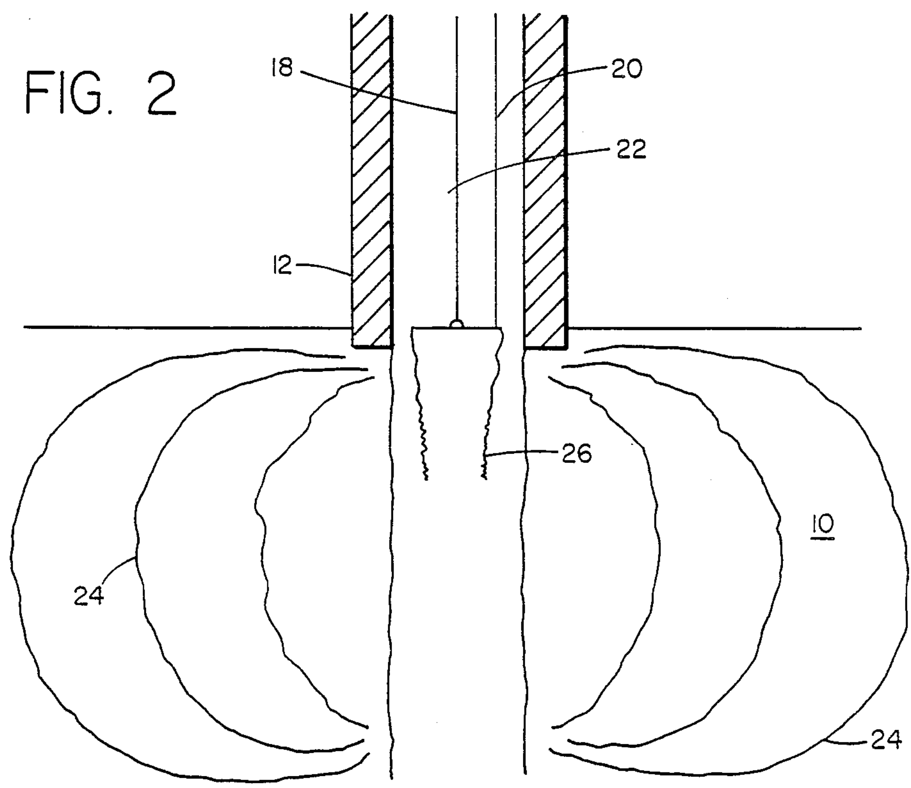
FIG. 2 is a graphic representation of a tamp fluid and housing means containing the propellant after ignition.

Once ignited, as is shown in FIG. 2, the heat, gas and pressure created by the propellant causes a total or partial disintegration of housing means or canister 26 which contained the propellant. However, as is shown in FIG. 2, cable 18 and ignition line 20 remain intact having sustained minimum damage. Once the pressure on wellbore 12 has dissipated, retrieval cable 18, and ignition line 20, along with remnants of housing means or canister 26 are removed from the wellbore.

Fluid 22, after ignition, flows into wellbore 12 where it can be removed by any suitable physical means such as pumping to the surface. After any debris and viscous fluid have been removed from the wellbore, hydrocarbonaceous fluids can be produced from a formation when the created fractures intersect a natural hydrocarbonaceous fluid containing fracture.

Although the present invention has been described with preferred embodiments, it is to be understood that modifications and variations may be resorted to without departing from the spirit and scope of this invention as those skilled in the art will readily understand. Such modifications and variations are considered to be within the purview and scope of the appended claims.

What is claimed is:

1. A method for increasing drag forces on a suspended propellant housing means and a propellant igniting means within a wellbore during controlled pulse fracturing comprising:

(a) directing a shear-thickening fluid into a wellbore which fluid is of a height sufficient to submerse said housing means and igniting means where compounds contained in said fluid are of a concentration sufficient to thicken the fluid by forces generated upon the ignition of a propellant;

(b) suspending said housing means with a propellant therein and the igniting means into said wellbore and fluid near a formation's productive interval; and (c) igniting said propellant thereby generating energy and pressure sufficient to initiate simultaneous multiple radial fractures while forcing said fluid upwardly in said wellbore thereby thickening said fluid which restricts movement of the housing and ignition means and minimizes damage thereto.

2. The method as recited in claim 1 where said shear thickening fluid comprises an aqueous mixture of a member selected from the group consisting of titanium oxide, corn starch, polyvinyl alcohol-sodium borate mixtures, polymethacrylates, poly (alkyl methacrylates), gum arabic and borate ions, and guar gum and borate ions.

3. The method as recited in claim 1 where housing means comprises a canister.

4. The method as described in claim 1 where the shear thickening fluid is of a substantially low viscosity which facilitates placement and removal within a well production string.

5. The method as recited in claim 1 where the propellant housing means is suspended by a wireline.

* * * * *